United States Patent [19]
Anthony

[11] 4,096,034
[45] Jun. 20, 1978

[54] HOLDDOWN STRUCTURE FOR A NUCLEAR REACTOR CORE

[75] Inventor: Andrew James Anthony, Tariffville, Conn.

[73] Assignee: Combustion Engineering, Inc., Windsor, Conn.

[21] Appl. No.: 751,784

[22] Filed: Dec. 16, 1976

[51] Int. Cl.² ............................................. G21C 13/09
[52] U.S. Cl. ......................................... 176/87; 176/38
[58] Field of Search ..................................... 176/38, 87

[56] References Cited

U.S. PATENT DOCUMENTS

| 3,115,448 | 12/1963 | Hackney et al. | 176/87 X |
| 3,640,032 | 2/1972 | Jubb | 176/87 X |
| 3,907,636 | 9/1975 | Swart | 176/87 |

Primary Examiner—Peter A. Nelson
Attorney, Agent, or Firm—Arthur L. Wade

[57] ABSTRACT

The core support barrel and upper guide structure of a nuclear reactor are hung from the upper internal ledge of the reactor vessel and clamped to the ledge with spring structure actuated from the vessel closure.

10 Claims, 3 Drawing Figures

HOLDDOWN STRUCTURE FOR A NUCLEAR REACTOR CORE

BACKGROUND OF THE INVENTION

1. Field of the Invention

This invention relates to opposing hydraulic forces on the core, and control structure of the core, to maintain these internals of a nuclear reactor vessel in position. More particularly, the invention relates to clamping the barrel for core support, and the cylinder for support of the guide structure, between the upper internal ledge and the vessel closure to overcome hydraulic forces within the vessel which are directed toward displacing the core support and guide structure.

2. Description of the Prior Art

The nuclear reactor is structurally and functionally centered about its core, mounted in the lower portion of the reactor vessel. This core, comprised of fuel pins, is specifically supported within a cylinder arranged within the vessel as a liner and hung from a ledge formed at the top of the vessel. This core support barrel is perforated on its bottom so that liquid coolant can flow up through the core to be heated. Further, the core support barrel is penetrated above the core so that the heated liquid coolant can leave the vessel as a working fluid. The differential of hydraulic force of the coolant, across the core, is tremendous and is directed toward displacement of the core and its supporting structure.

The control rods of the core are reciprocated into and out of the core from above. These rods, and their reciprocating mechanism, are mounted in the plenum above the core where they are shrouded by tubes from direct contact with the coolant. As the heated coolant liquid passes through the plenum toward the vessel outlet, it exerts its tremendous force on these shroud tubes.

A second cylinder is telecoped within the core support barrel for support of the shroud tubes and mechanism associated with the control rods. This upper guide support structure is also hung from the upper vessel ledge and extends down to a short distance above the core. This structure is the basic subject matter of U.S. Pat. No. 3,849,257 issued Nov. 19, 1974 and opposes the hydraulic forces in the vessel plenum as they are developed on the shroud tubes.

In designing for the tremendous hydraulic forces generated on the in-vessel structure, the core support barrel and upper guide support structure have simply been flanged on their upper ends and thereby hung from the upper ledge of the reactor vessel. The heavy closure of the vessel has been sized to clamp the flanges of the barrels to the upper vessel ledge as the closure is bolted to the vessel top. If the differential expansion between the upper guide support barrel structure, core support barrel, vessel and closure were slight, the bolt up loading of the closure would provide a force large enough to prevent displacement of the barrels in opposition to the tremendous values of hydraulic forces imposed upon them. However, since the radial and axial differential expansion is large and must be accounted for to avoid both high stresses in the flanges and overloading of closure bolts, an alternative structure must be formed.

A flexible ring structure has been placed between the barrel flanges and the closure to transfer holddown force from the closure to the barrels. The effectiveness of a ring-type holddown device has been only marginally capable of providing the required holddown forces. As the size of reactor vessels and flow through them increases, the problem of generating the required holddown force through a ring-type device is more difficult because of size and space limitations. It is relatively easy to design a ring which has high load carrying potential. It is also easy to design a ring which can accept a large amount of deflection to accommodate differential expansion, mechanical tolerances and flange rotation due to bolt up and pressurization. It is very difficult, however, to achieve these combined characteristics with a single ring-type device.

Finally, there is the economic factor. The ring-type device is large and requires special, precise machining. It appears to be a reasonable goal to reduce these costs in excess of $50,000.

Spring assemblies have been placed between closures and barrel flanges hung on the vessel ledge. Specifically, stacks of Belleville springs have been placed in machined pockets of a ring between the closure and core support barrel flange to bear against the flange. This design crams a large number or relatively small-size Belleville springs in their specially machined ring pockets at the periphery of the flange on the upper guide structure. This structure is also expensive to fabricate because of the machining involved, the large amount of hand work and the inspection required.

A spring structure including the Belleville spring will solve the present problem. However, the spring structure must be mounted more simply and directly between the reactor vessel closure and both flanges of the upper guide structure and core support barrel in stabilizing the flanges on the vessel ledge.

SUMMARY OF THE INVENTION

A principal object of the invention is to generate a resilient, predetermined force with which to clamp the upper guide structure flange and core support barrel flange to the upper internal ledge of their reactor vessel.

Another object is to generate a spring force between the vessel closure and the guide structure and support barrel with relatively few, large Belleville springs mounted in vertical alignment with the wall of the guide structure.

The invention contemplates mounting posts on the flange of the upper guide structure to extend vertically upward. Belleville springs are stracked on each post and a tube extended down from the internal side of the closure, over the post, to bear on the top of the spring stack and transfer loading on the closure to the flange.

The invention further contemplates the Belleville springs being relatively large and few in number and the flange of the core support barrel underlying the flange of the upper guide structure so that both are clamped to the vessel ledge by the springs.

Other objects, advantages and features of the invention will become apparent to one skilled in the art upon consideration of the written specifications, appended claims, and accompanying drawings.

DRAWING DESCRIPTION

DESCRIPTION OF THE PREFERRED EMBODIMENT REACTOR VESSEL AND CORE GENERALLY

Figure 1:
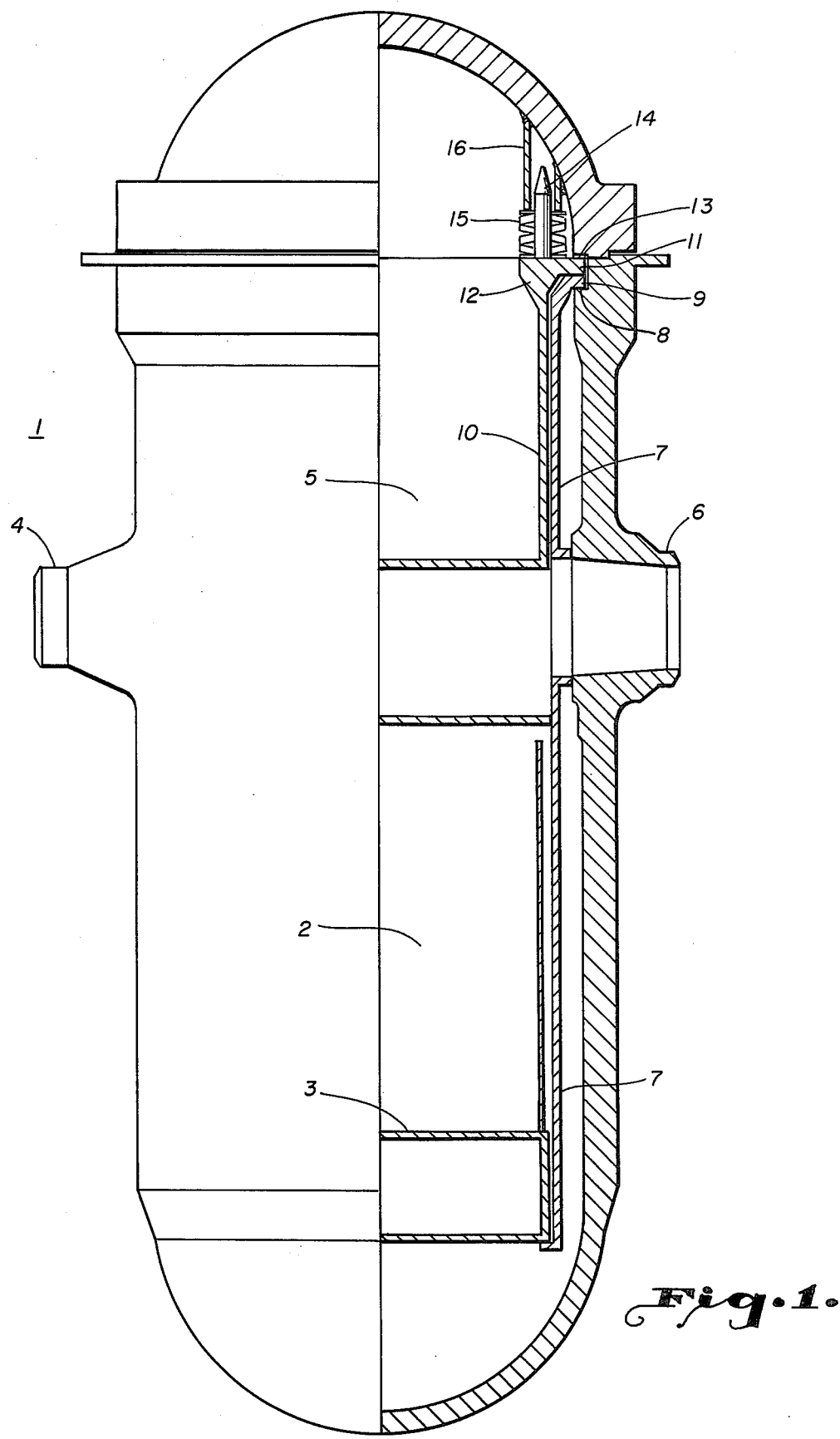
FIG. 1 is a partially sectioned elevation of a nuclear reactor vessel in which the invention is embodied.

FIG. 1 discloses a general type of nuclear reactor vessel 1. In the lower section of the vessel is located a core, or fuel region 2.

The common practice is to form the core of a plurality of nuclear fuel elements. It is usual to arrange the fuel rods, or pins, in assemblies through which coolant can flow in their passages.

There is no need to consume time and attention with the form and arrangement of fuel pins or the assemblies formed with them. Considered as a unit, it is clear enough that the core is located at 2 and is supported on apertured, and horizontal, plate 3. Coolant flows up through plate 3 and the core supported above it.

The coolant is flowed into the vessel 1 through entrance nozzel 4. Baffles direct the coolant to below plate 3 for its flow up toward plenum 5, above the core, and out exit nozzel 6 of the vessel. Heated by the core, this coolant is discharged as a working fluid with which to deliver thermal energy in the form of work.

Plate 3 supports core 2 and, in turn, is fixed in position by connection to core support barrel 7. Core support barrel 7 hangs from, is supported by, the internal ledge 8 which is formed on the vessel 1 at its upper edge.

As outlined supra, the hydraulic forces generated by the coolant flowing through the core must be successfully opposed. Otherwise the barrel will be distorted, displaced, or at least vibrated, none of which can be tolerated in this art. Therefore, the structure embodying the invention must effectively clamp flange 9 of the core support barrel to its seat on ledge 8. However, there is another complication which must be considered.

UPPER GUIDE STRUCTURE

Neutron poison, in the form of rods, is reciprocated into and out of core 2. These rods control the output of the core, the heat transferred to the coolant.

The mechanism with which the rods are reciprocated is mounted on, supported by, structure above the core. The subject matter of U.S. Pat. No. 3,849,257, issued Nov. 19, 1974, was concerned with this reciprocating structure and shielding it from the hydraulic forces of the coolant flowing from the core to the vessel outlet. All of this mechanism, including its coolant shields, is temed "upper guide structure" (UGS). It is provided its own cylindrical barrel 10, suspended witthin the upper portion of the core support barrel 7. This UGS barrel has an upper flange 11 formed on its rim. This UGS flange is engaged with the top of the flange 9 of the core support barrel, so both barrels are hung from the ledge 8 of the reactor vessel. Therefore, when clamping of both barrels to ledge 8, the clamping force is specifically applied to the top of flange 11. The present invention provides this clamping force from the reactor vessel head closure. Further, the clamping force is applied through spring structures, loaded from the bolts of the head closure.

HOLDDOWN STRUCTURE IN GENERAL

FIG. 1 discloses the two flanges 9, 11 engaged with ledge 8. The bolts of the head closure are not disclosed, nor are details such as alignment pins between the flanges 9, 11 and the ledge 8.

The concept of the invention is to apply the holddown force as far inwardly on the flanges 9, 11 as practical. FIG. 1 discloses the inner region of flange 11 can be locally built up at 12 so the holddown force can be vertically applied to the upper surface 13 of flange 11 in alignment with the vertical wall of the barrel 10. This alignment of the holddown force with the wall of barrel 10 lowers the stress in both barrels, and their flanges, under the internal hydraulic forces.

The structure mounted on surface 13 is organized about a vertical post member 14. This post is mounted by one end directly on surface 13 and can be seen in FIG. 1 to extend vertically toward the closure head. The axis of this post 14 aligns with the wall of barrel 10. Spring structure 15 is then arranged about post 14 and rests directly upon surface 13. A holddown tube 16 is placed over the upper part of post 14, above the spring structure 15, and forms the link between the closure head and the spring structure with which the spring structure is loaded to apply the desired holddown force to the flanges 9, 11.

The invention is embodied in the post 14, spring 15 and tube 16 as positioned to apply the holddown force generated from the bolts of the closure head. Further, the invention includes the concept of providing the flange 11 with a built-up section 12 so the surface 13 will align with the UGS barrel wall.

SPRING STRUCTURE 15

Present technology favors the use of the Belleville spring in structure 15. It is common to use a stack of these Belleville springs as a unit. They are obviously adaptable to this embodiment of the invention.

The Belleville spring has been used in similar service. However, the past practice was to form a special flange between the barrel flanges and closure head in which pockets, for stacks of Belleville springs, were machined at positions near the outer edges of the flanges of the barrels. Relatively small diameter springs were used. Relatively large numbers of springs were formed into the stacks within the flange pockets. Holddown force was generated on the barrel flanges by this arrangement. However, the special flange, special pocket machine work and large numbers of spring units required were high in cost. At the same time, the placement of the spring structure near the outer edges of the flanges, did not provide the stress relief desired for the barrels, and their flanges, under high values of hydraulic loading.

In the design of an actual reduction to practice, a Belleville spring element was selected in the order of 7 inches in outside diameter, 3.9 inches in inside diameter and 0.5 inches in thickness. The cone height was designed at 0.08 inches with a deflection on the order of 0.06 inches. This is a relatively large Belleville spring unit, compared to the one used in prior reactors.

GENERAL REACTOR INSTALLATIONS

Figure 2:
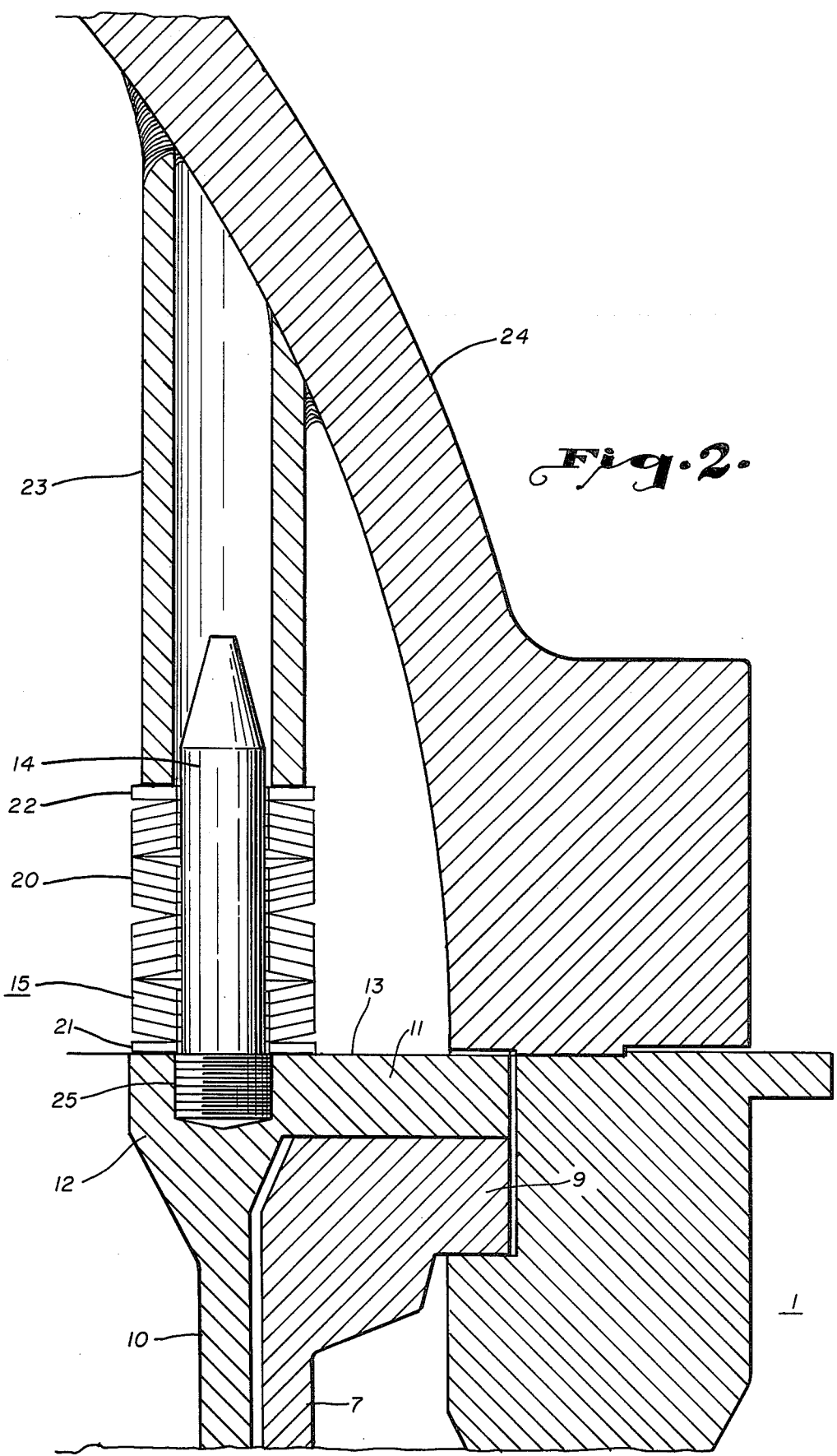
FIG. 2 is fragment of FIG. 1, disclosing that embodiment of the invention in greater detail.

FIGS. 1 and 2 disclose the invention embodied in what is intended to be the general organization of reactor vessels. FIG. 2 can then be considered as an enlarged view of the more immediate and pertinent structure associated with the spring structures.

The spring structure 15 of FIG. 1 is now disclosed in greater detail. The plural groups of Belleville springs 20 are stacked contiguously to form structure 15. The groups alternate in the vertical directions they face. Flat washers 21 and 22 are on the top and bottom of the structure 15 as a unit. This organization brings washer 21 against upper surface 13 of upper flange 11. Washer 22 provides a flat surface for tube 23 to contact in applying holddown force from closure head 24 to the spring structure 15.

Tube 23 is disclosed as welded by its upper end to the underside of closure head 24. Axially aligned with post 14, the tube 23 is formed with the length with which it will depress spring unit 15 the distance which will generate the desired holddown force on the surface 13 when head 24 is bolted to the vessel 1.

Post 14 is disclosed as threaded into mounting hole 25 in built-up section 12. Hole 25 is placed in vertical alignment with the wall of barrel 10. The result of this arrangement is a force directly applied to relief of stress in barrel 10, barrel 7 and their flanges 9, 11.

SYSTEM 80 REACTOR

Figure 3:
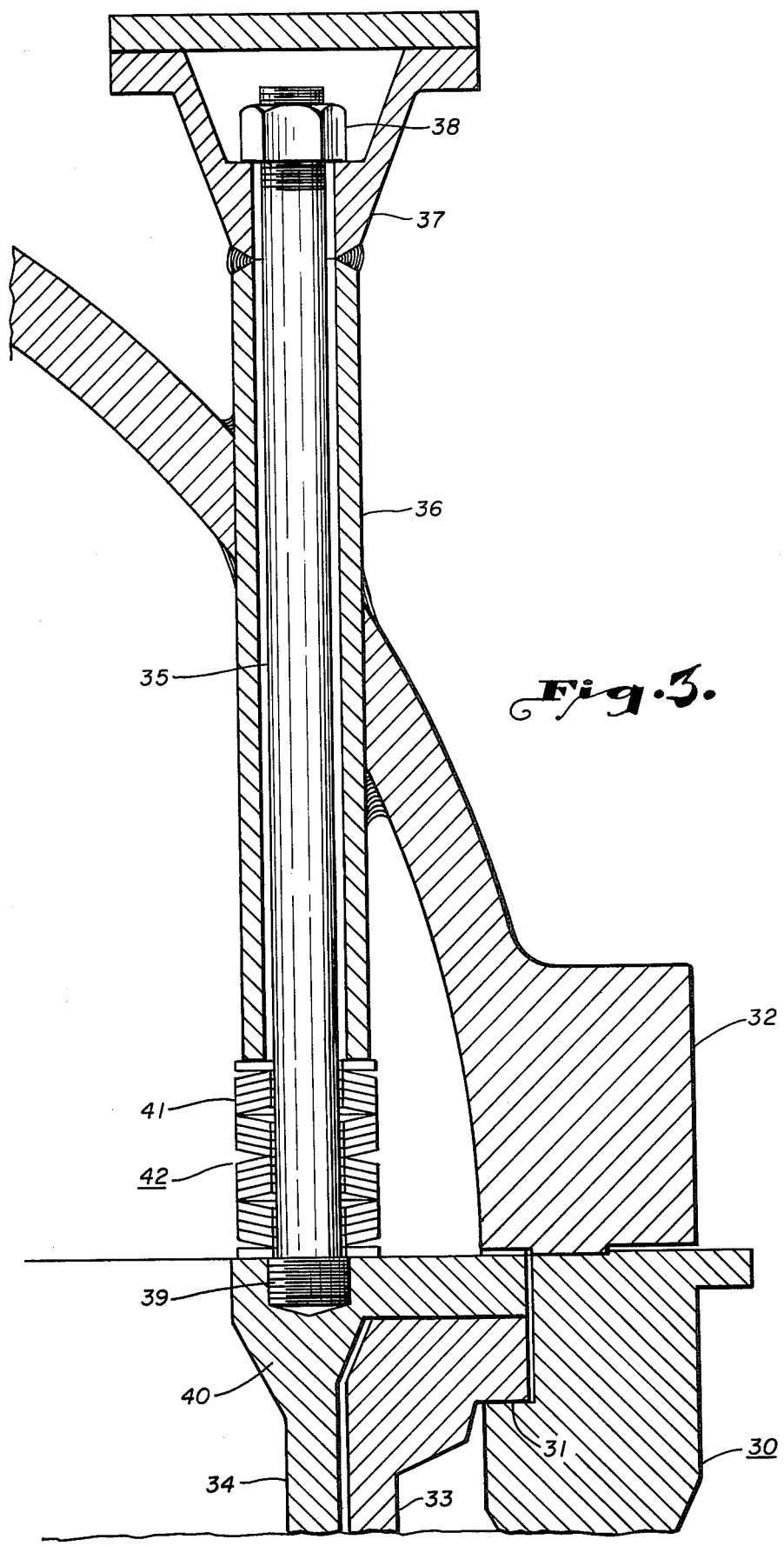
FIG. 3 is a sectioned elevation of a second embodiment of the invention in the system 80 reactor.

System 80 reactors provide an opportunity to use part of another system to embody the invention. FIG. 3 is of the same portion of a reactor vessel as FIG. 2, but also disclosing an arrangement of structure characteristic of System 80 reactors.

Reactor vessel 30 is disclosed in FIG. 3 with ledge 31 formed internally on the upper edge of the vessel. Closure head 32, core support barrel 33 and UGS 34 complete the overall organization of structure comparable to the disclosure of FIGS. 1 and 2.

In the system 80 reactors, one distinctive arrangement functions to remove both the closure head 32 and the UGS barrel 34. A connecting link is formed between the head 32 and barrel 34 with bolt 35 so the barrel can be locked to the head for simultaneous removal when the reactor is disassembled for refueling or service of its internals.

More specifically, connector bolt 35 is extended through closure head 32 in a nozzle 36 which is essentially a tube mounted through the head. Closure flange 37 is mounted on the upper end of nozzle tube 36. The upper end of bolt 35 is extended up into flange 37 and has nut 38 threaded on the end to bear against closure flange 37. The lower end of bolt 35 is threaded into hole 39 in built-up section 40 of UGS 34.

Belleville spring units 41 are stacked over the lower end of connector bolt 35 to form the spring structure 42. The specific arrangement of the units 41, in their groups, is expected to be similar to the arrangement of FIGS. 1 and 2 for structure 15. The nozzle 36, is positioned, and provided the length, to bear upon spring structure 42 to generate the force required to load spring structure 42 from the head closure bolts not disclosed. Therefore, the bolt 35 serves the System 80 reactors as a connector for removing the UGS barrel 34 with the closure head 32 and aligning the spring structure 42 for its generation of the holddown force required to overcome the hydraulic forces unleashed upon the internal barrels of the vessel.

The force is generated through relatively small numbers of relatively large sized Belleville spring units. The end result is a successful opposition of hydraulic forces on the barrels, and their contents, which would otherwise vibrate and even shift in position.

The specific example of the FIG. 3 embodiment of the invention in a System 80 reactor which utilizes 128 Belleville springs in eight of the FIG. 2 columns. These columns will provide a holddown force of 960,000 pounds with a spring defection of 0.240 inches. This force, of course, is developed with the 7-inch Belleville spring unit of inconel 718. The cost of this holddown system should not include that for the connector bolts and nozzles which are a part of another system. Therefore, the cost should be under 20,000 and compares favorably with the prior art. Rough estimates would have it that this approach is one-fifth the expense of the prior art structure.

From the foregoing, it will be seen that this invention is one well adapted to attain all of the ends and object hereinabove set forth, together with other advantages which are obvious and inherent to the apparatus.

It will be understood that certian features and sub-combinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. In a nuclear reactor vessel, a structure for applying a holddown force to the upper guide structure barrel and the core support barrel, including,
   an internal ledge formed on the upper end of the vessel,
   a core support barrel positioned down and within the vessel,
   a flange formed on the upper end of the core support barrel and arranged to engage the internal ledge of the vessel to hang the barrel from the ledge,
   an upper guide structure barrel positioned down and within the core support barrel,
   a flange formed on the upper end of the upper guide structure barrel and arranged to engage the flange of the core support barrel to hang both barrels from the internal ledge on the upper end of the vessel,
   a vertical post member mounted by its lower end to upper surface of the flange of the upper guide structure barrel,
   a spring structure arranged about the post member and bearing on the surface of the flange of the upper guide structure barrel,
   a closure of the reactor vessel and means for seating the closure on the upper end of the vessel with a predetermined force,
   and a tube attached by its upper end to the inside of the closure and arranged to extend vertically down about the post member to engage the spring structure and load the spring structure in transmission of the force seating the closure to the barrels on the vessel ledge.

2. The structure of claim 1, in which,
   the spring structure is comprised of a series of Belleville springs retained in vertical alignment by arrangement about the post.

3. The structure of claim 1, in which,
   a built up region is provided on the upper end of the upper guide structure barrel and the inner end of the barrel flange to form the mount for the lower end of the vertical post member.

4. The structure of claim 3, in which,
   the vertical post member is mounted on the built up region to extend in substantial alignment with the vertical sides of the upper guide structure barrel.

5. The structure of claim 2, in which,
the Belleville springs have diameters in the order of seven inches and are formed of inconel 718.

6. The structure of claim 1, in which,
the vertical post member is provided the length to extend from its mounting on the upper surface of the flange of the upper guide structure barrel through and above the closure on the reactor vessel,
the tube attached to the closure extends through the closure and about the post, and a means connecting the tube and post external the vessel to form a link between the closure and upper guide structure.

7. In a nuclear reactor vessel, a structure for applying a holddown force to the upper guide structure barrel and the core support barrel and releasably connecting the vessel closure and barrels, including,
an internal ledge formed on the upper end of the vessel,
a core support barrel positioned down and within the vessel,
a flange formed on the upper end of the core support barrel and arranged to engage the internal ledge of the vessel to hang the barrel from the ledge,
an upper guide structure barrel positioned down and within the core support barrel,
a flange formed on the upper end of the upper guide structure barrel and arranged to extend outwardly over the flange of core support barrel so both barrels hang from the internal ledge on the upper end of the vessel,
a vertical post member attached to the upper end of the upper guide structure barrel and extend from the upper surface of its flange through an opening in the vessel closure to above the closure,
a spring structure arranged about the post member and bearing on the upper surface of the flange of the upper guide structure barrel,
a closure for the reactor vessel and means for seating the closure on the upper end of the vessel with a predetermined force,
and a tube extended through the closure and attached to the closure between its ends and receiving the post therethrough and extended vertically down to engage the spring structure in loading the spring structure to transmit the closure seating force to the barrels and extended vertically up to a releasable connection with the post external the vessel.

8. The structure of claim 7, in which,
the spring structure is a series of Belleville springs through whose central holes the post extends.

9. The structure of claim 8, in which,
the Belleville springs have a diameter in the order of seven inches and are formed of inconel 718.

10. In a nuclear reactor vessel, structure for applying a holddown force to to reactor vessel internals, including,
a closure located at the upper end of the reactor vessel,
a reactor vessel internals support barrel having an upper edge and supported by the reactor vessel,
a tube attached from its upper end to the inside of the closure and arranged such that when the vessel is closed the tube extends downward from inside of the closure in substantial vertical alignment with the barrel walls,
a spring structure within the reactor vessel and extending from engagement with the lower end of the tube and engagement with the upper edge of the barrel that is vertically below the tube,
means for vertically aligning the spring structure with tube when the closure is being seated on the reactor vessel,
and means for tightening the closure to the reactor vessel to develop the spring force on the support barrel as it is supported by the reactor vessel.

* * * * *